United States Patent [19]

Grozinger et al.

[11] 4,351,102
[45] Sep. 28, 1982

[54] METHOD FOR WINDING THE STATOR IN A THREE PHASE AC MACHINE

[75] Inventors: Alfred Grozinger, Stuttgart; Manfred Frister; Helmut Kreuzer, both of Schwieberdingen, all of Fed. Rep. of Germany

[73] Assignee: Robert Bosch GmbH, Stuttgart, Fed. Rep. of Germany

[21] Appl. No.: 937,913

[22] Filed: Aug. 30, 1978

[30] Foreign Application Priority Data

Nov. 9, 1977 [DE] Fed. Rep. of Germany ....... 2750112

[51] Int. Cl.³ .......................................... H02K 15/085
[52] U.S. Cl. .................................... 29/596; 242/1.1 R
[58] Field of Search .......................... 29/596, 605, 628; 242/1.1 R, 1.1 A, 1.1 E

[56] References Cited

U.S. PATENT DOCUMENTS 3,044,150 7/1962 Higley .................................. 29/596
3,290,759 12/1966 Cory .................................... 29/596
3,760,493 9/1973 Snively ................................ 29/596

Primary Examiner—Carl E. Hall
Attorney, Agent, or Firm—Frishauf, Holtz, Goodman & Woodward

[57] ABSTRACT

The first, second and third winding for the stator of a three phase AC machine having n grooves per pole and phase are wound either sequentially or simultaneously. When wound sequentially, the first, second and third winding start at, respectively, a first, second and third groove and end at a first, second and third end groove. The starting grooves are adjacent grooves, that is spaced from each other by a number of grooves equal to n. The same is true for the end grooves. The wires are then interconnected such that the winding start and the winding end of the second winding are electrically interchanged. The winding process takes place in one direction only. When all windings are wound simultaneously, the winding process takes place in a first direction and, upon reaching the end grooves, the winding direction is reversed without creating a winding end at the end grooves. The winding ends are created when the winding in the opposite direction is completed.

7 Claims, 7 Drawing Figures

METHOD FOR WINDING THE STATOR IN A THREE PHASE AC MACHINE

The present invention relates to a method for winding the stator of a three phase AC machine. In particular it relates to a winding method suitable for machine winding of the stator of an AC generator.

Background and Prior Art

Methods are known by which a two layer winding is manually wound onto the stator of an AC generator. However machine winding of generators having relatively small stator inner diameters and a high number of grooves is generally not possible because first the lower layer of all coils must be wound and inserted into the grooves and only then can the upper layer be inserted. Since the upper layer is within the internal space of the stator, it is in the way when the lower layer is inserted. Further, in AC machinery with a small internal diameter there is not sufficient room for accommodating the inserting mechanism of an automatic winding machine. In known machine winding methods, the coils for the different phases are inserted into the grooves of the stator as single windings in the sequence in which the electrical phase angle of 120° exists between sequentially wound windings. In this method, cross-over points for the winding ends result and further, the insertion of a subsequent winding is hindered by the already present preceding winding.

The Invention

It is an object of the present invention to furnish a winding method in which the coil or winding ends do not interfere in the winding process. It is a further object of the present invention to furnish a winding method in which a particularly high space utilization factor results for the grooves of the stator. Briefly, in accordance with the invention, in a three phase AC machine having a plurality of poles and a stator having a predetermined number n grooves per pole and phase, a first winding is wound from a first starting groove to a first end groove and a wire end is furnished near said first end groove. A second winding is wound starting at a second groove adjacent to said first groove and ending at a second end groove adjacent to said first end groove. Again, a second wire end is supplied near said second end groove. A third winding is wound starting at a third starting groove adjacent to said second groove and ending at a third end groove adjacent to said second end groove. A third wire end is created near said third end groove. The starts of the winding at said first, second and third groove and said first, second and third wire ends are then electrically interconnected in such a manner that the start of the second winding and the second winding end are electrically interchanged. In a preferred embodiment distributed windings are used in order to increase the space factor for the grooves and to create an even better arrangement of the coil ends.

DRAWINGS ILLUSTRATING A PREFERRED EMBODIMENT

FIG. 1 shows the variation of voltage induced in each of three windings as a function of the angle of rotation of the stator. As is well known, an angle of 120° exists between the individual phases.

Figure 1:
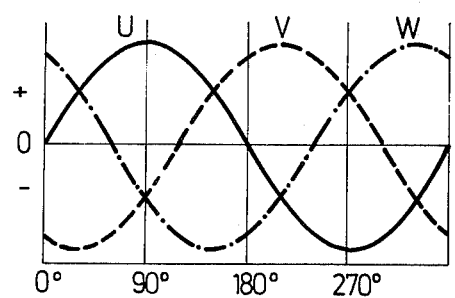
FIG. 1 shows the voltages induced in each winding of a three phase AC generator as a function of angle of rotation.
Figure 2:
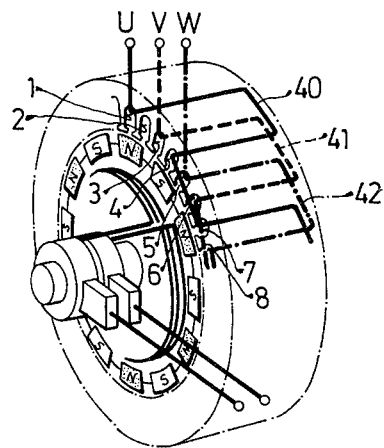
FIG. 2 is a schematic diagram showing the construction of an AC generator.
Figure 4:
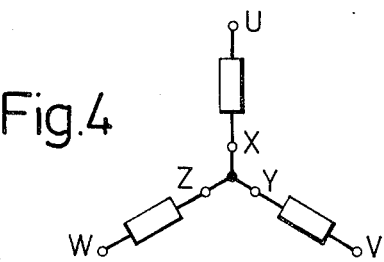
FIG. 4 shows a three phase winding connected in a Y connection.
Figure 3:
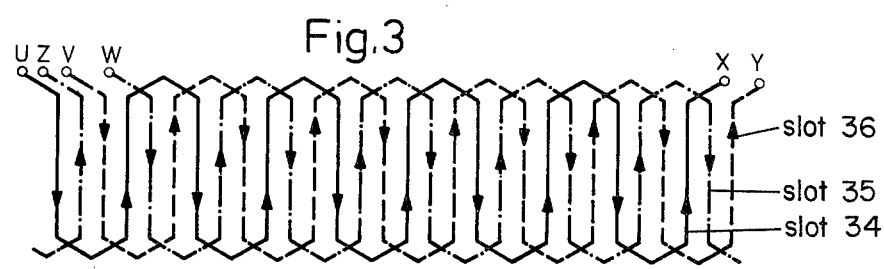
FIG. 3 is a winding diagram of a known winding method.

FIG. 2 shows the construction of a 12 pole three phase AC generator. The number of poles $2p$ is equal to 12, and the number of grooves per pole and phase n is equal to 1. For a three phase AC winding the number of phases m equal 3. The number of grooves N is thus N equal 36. As shown in FIG. 2, the first winding is started at groove 1. Specifically, a winding 40 whose winding start is designated by the letter u is inserted into groove 1, a winding 41 whose winding start is denoted by the letter v is inserted into groove 3 and a winding 42 whose winding start is denoted by the letter w is inserted into groove 5. FIG. 3 shows the winding diagram corresponding to this known method. The start of the first winding 40 is denoted by u, that of the second winding 41 by v and that of the third winding by w. Winding end x of the first winding is in groove 34, the winding end y of the second winding in groove 36 and the winding end z of the third winding in groove 2. An electrical phase angle of 120° results between the individual conductors of the three phase winding. The individual windings are then connected as desired, for example in a known Y connection as shown in FIG. 4. Specifically, winding ends x, y, z are connected at a common point. The winding diagram shown in FIG. 3 is disadvantageous for machine winding, because the winding ends interfere with each other and thereby cause the space factor for the individual grooves to be very low.

Figure 5:
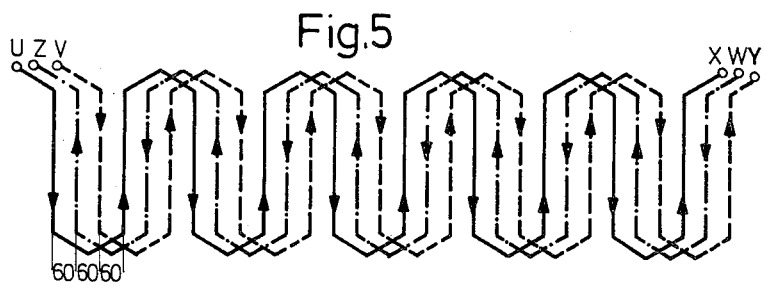
FIGS. 5-7 show a first, second and third embodiment of a winding method of the present invention as applied to a three phase 12 pole AC generator.

A more advantageous winding method and one which is easier to carry out on a machine is shown in FIG. 5. In this winding diagram in accordance with the present invention, a first winding is inserted in groove 1. The start of the first winding is denoted by the letter u. This strand is then wound through groove 4, etc. The winding end of the first winding is in groove 34. Thereafter a strand is inserted into the second groove 2 and wound until it ends at groove 35. Finally, a strand is inserted in groove 3 and wound to end at groove 36. The start of the winding inserted in groove 3 is v, the end of the strand ending at groove 36 is y. If now the strand starting in groove 2 is considered, it will be noted that a phase angle of 120° relative to the other two phases will result if the ends of this second winding or strand are interchanged, that is if the winding start is considered at groove 35 (and is therefore denoted by w) while the winding end is considered the end in groove 2 which has the designation z. With this electrical interchange, each of the three windings has an electrical phase angle of 120° relative to the other two. The winding diagram shown in FIG. 5 results in a process wherein the coil ends do not interfere with each other during insertion of the windings. This allows the space utilization factor to be substantially increased.

If a distributed winding is used, a further improvement in winding ease and in the space utilization factor results. For this purpose, a first partial winding is wound starting at groove 1, the winding continuing in the direction of increasing groove numbers from $u_1$ to $x_1$. Next, starting in groove 2 and winding in a direction with increasing groove numbers, a second winding is wound from $z_1$ to $w_1$, while the third partial winding starting in groove 3 is wound from $v_1$ to $y_1$. After this first group of partial windings has been inserted, a second group of partial windings is wound and inserted into the grooves as shown in FIG. 5. The insertion of the windings for the first phase of the second group of windings starts in groove 4, the winding taking place from $x_2$ to $u_2$. Thereafter the second partial winding is started in groove 5. The winding proceeds from $w_2$ to $z_2$. Finally, the second partial group for the third phase is wound starting in groove 6 and proceeding in the same direction from $y_2$ to $v_2$. It will be noted that the winding direction for the first, second and third groups of partial windings is the same, that is in the direction of increasing groove numbers. The phase angle of 120° between individual phases is again achieved by interchanging the end terminals of the middle winding.

Figure 6:
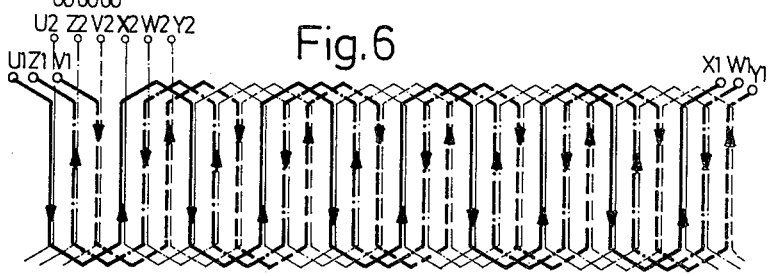

The coil ends are then connected as follows: $u_1$ is connected to $u_2$ to yield end u; $v_1$ is connected to $v_2$ to yield end v; $w_1$ is connected to $w_2$ to yield end w. For a Y connection, the coil ends $x_1$, $x_2$, $y_1$, $y_2$, $z_1$, $z_2$ are all interconnected to constitute the center point of the Y. The distributed winding diagram shown in FIG. 6 illustrates a method which yields a particularly high space factor for the grooves of the stator. The individual coil ends of the windings are arranged next to each other similarly as in a two layer winding without interfering with each other either during or after insertion. It is a further advantage of the method illustrated by the diagram of FIG. 6 that the winding takes place in the same direction throughout. This advantage compensates for the slight disadvantage which results from the fact that 12 winding ends must be electrically connected to each other.

Figure 7:
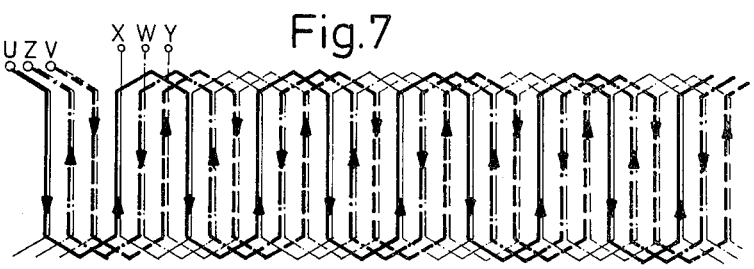

The disadvantage of having to connect the 12 winding ends to each other can be eliminated by the method shown in FIG. 7. If the method illustrated in FIG. 7, the individual windings of the different phases are wound simultaneously. That means that the first group of partial windings is wound simultaneously, starting, respectively, in grooves 1, 2 and 3. After the winding of this set of partial windings has been completed, a second group of partial windings is wound in the opposite direction and inserted into the corresponding grooves, the winding ends appearing in the fourth, fifth and sixth grooves. Again, the ends z and the start w of the second winding are electrically exchanged thereby creating a phase angle of 120° between the individual partial windings of each group. In the embodiment according to FIG. 7, the coil ends do not interfere with each other either in the inserted condition or during insertion. Here, too, a particularly high space factor results, allowing a higher power output for a machine having the same dimensions as known machines utilizing the previously known winding method.

The winding methods described above are in principle as applicable to a lap winding as they are to a wave winding. However, for manufacture on automatic winding machines, the wave winding has been found particularly advantageous.

While the invention has been illustrated for a 12 pole machine, the same principle applies to AC machines having any other number of poles, the distance between "adjacent" grooves always being equal to the number of grooves per pole and phase. For example if the number of grooves per pole and phase, $n=2$, grooves 1 and 2 belong together so that the set of grooves 1, 2 and the set of grooves 3, 4 together constitute adjacent grooves.

Various changes and modifications may be made within the scope of the inventive concept.

We claim:

1. A method for winding a first, second and third winding each having a winding start on a stator to constitute the first, second and third phase of a three phase AC machine said three phase AC machine having a plurality of poles and a stator having a predetermined number n grooves per pole and phase, said method comprising the combination of steps of
    winding said first winding starting at a first groove and ending at a corresponding first end groove and creating a first winding end in operative proximity of said first end groove;
    winding said second winding starting at a second groove adjacent to said first groove and ending at a second end groove adjacent to said first end groove, and creating a second winding end in operative proximity of said second end groove;
    winding said third winding starting at a third groove adjacent to said second groove and ending at a third end groove adjacent to said second end groove, and creating a third windend in operative proximity of said third end groove, adjacent grooves being spaced from each other by a number of grooves equal to n; and
    the step of electrically connecting either said start of said first and third winding to said second winding end or said first and third winding end to said start of said second winding to provide the star point of a Y-connected combined winding.

2. A method as set forth in claim 1, wherein said first, second and third winding constitute a first, second and third partial winding, respectively;
    further comprising the step of winding a fourth, fifth and sixth partial winding starting, respectively, at a fourth groove adjacent to said third groove, a fifth groove adjacent to said fourth groove, and a sixth groove adjacent to said fifth groove and ending at, respectively, said first, second and third grooves, thereby creating a fourth, fifth and sixth winding end in operative proximity of said first, second and third grooves respectively, and electrically interconnecting said starts of said first, second and third partial winding ($U_1$, $Z_1$, $V_1$) to said fourth, fifth and sixth winding ends ($U_2$, $Z_2$, $V_2$) and said start of said fourth, fifth and sixth partial winding ($X_2$, $W_2$, $Y_2$) to said first, second and third winding ends ($X_1$, $W_1$, $Y_1$), respectively, thereby creating a first ($U_1$-$X_1$), second ($W_1$-$Z_1$), and third ($V_1$-$Y_1$) distributed winding respectively.

3. A method as set forth in claim 2, wherein said step of winding said first, second, third, fourth, fifth and sixth partial windings comprises winding said first, second, third, fourth, fifth and sixth partial winding sequentially in that order.

4. A method for winding a first, second and third winding each having a starting end onto a stator of a three phase AC machine having a stator having a plurality of grooves, said method comprising the steps of
    winding a first, second and third partial winding in a first direction from, respectively, a first, second and third starting groove to a first, second and third end groove;

reversing the direction of winding at said first, second and third end grooves and winding said first, second and third windings in the so-reversed direction to, respectively, a first, second and third final groove (X, W, Y, FIG. 7);

creating a first, second and third wire end at said first, second and third final groove respectively; and electrically connecting together said starting end (z) of said second winding and said first and third wire ends (X,Y), to provide the star point of a Y-connected combined winding.

5. A method as set forth in claim 4, wherein said AC machine has a plurality of poles and a predetermined number n number of grooves per pole and phase;

and wherein said first final groove is spaced from said third starting groove by said predetermined number n of grooves.

6. A method a set forth in claim 5, wherein said first, second and third starting grooves are spaced from each other by a predetermined number of grooves equal to n.

7. A method as set forth in claim 4, wherein said step of winding a first, second and third partial winding comprises the step of winding said first, second and third partial winding simultaneously.

* * * * *